US005704053A

United States Patent [19]
Santhanam

[11] Patent Number: 5,704,053
[45] Date of Patent: Dec. 30, 1997

[54] EFFICIENT EXPLICIT DATA PREFETCHING ANALYSIS AND CODE GENERATION IN A LOW-LEVEL OPTIMIZER FOR INSERTING PREFETCH INSTRUCTIONS INTO LOOPS OF APPLICATIONS

[75] Inventor: Vatsa Santhanam, Campbell, Calif.

[73] Assignee: Hewlett-Packard Company, Palo Alto, Calif.

[21] Appl. No.: 443,653

[22] Filed: May 18, 1995

[51] Int. Cl.$^6$ ....................................................... G06F 9/45
[52] U.S. Cl. .............................................. 284/383; 395/705
[58] Field of Search ................................ 395/425, 375, 395/700, 383, 705

[56] References Cited

U.S. PATENT DOCUMENTS

| | | | |
|---|---|---|---|
| 5,193,167 | 3/1993 | Sites et al. | 395/425 |
| 5,214,766 | 5/1993 | Liu | 395/425 |
| 5,377,336 | 12/1994 | Eickemeyer et al. | 395/375 |
| 5,396,604 | 3/1995 | DeLano et al. | 395/375 |
| 5,537,620 | 7/1996 | Breternitz, Jr. | 395/700 |

OTHER PUBLICATIONS

Chen, T–F, et al., A Performance Study Of Software & Hardware Data Prefetching Schemes, Apr. 1, 1994, Computer Architecture News, vol. 22, No. 2, pp. 223–232.
Abraham, S G, et al., Predictability Of Load/Store Instruction Latencies, Dec. 1–3, 1993, Proceedings Of The Annual International Symposium On MicroArchitect, Austin, pp. 139–152.
Chi, C–H, et al., Compiler Driven Data Cache Prefetching for High Performance Computers, Proceedings of the regional 10 Annual International Conference, Tenco, Singapore, Aug. 22–26, 1994, vol. 2, No. Conf. 9, pp. 274–278.
Callahan, ., et al., Software Prefetching, ACM Sigplan Notices, vol. 26, No. 4, Apr. 8, 1991, pp. 40–52.
Mowry, T C, et al., Design and Evaluation of a Compiler Algorithm for Prefetching, ACM Sigplan Notices, vol. 27, No. 9, Sep. 1, 1992, pp. 62–73.

Callahan, David, et al., "Software Prefetching", 1991, Association for Computing Machinery.
Klaiber, Alexander C., et al., "An Architecture for Software–Controlled Data Prefetching", May 1991, Int'l Symposium on Computer Architecture.
Chen, William Y., et al., "Data Access Microarchitectures for Superscalar Processors with Compiler–Assisted Data Prefetching", Proceedings of the 24th Int'l Symposium on Microarchitecture.
Mowry, Todd C., et al., "Design and Evaluation of a Compiler Algorithm for Prefetching", 1992, Association for Computing Machinery.
Johnson, Eric E., "Working Set Prefetching for Cache Memories".

(List continued on next page.)

Primary Examiner—Thomas C. Lee
Assistant Examiner—David Ton

[57] ABSTRACT

A compiler that facilitates efficient insertion of explicit data prefetch instructions into loop structures within applications uses simple address expression analysis to determine data prefetching requirements. Analysis and explicit data cache prefetch instruction insertion are performed by the compiler in a machine-instruction level optimizer to provide access to more accurate expected loop iteration latency information. Such prefetch instruction insertion strategy tolerates worst-case alignment of user data structures relative to data cache lines. Execution profiles from previous runs of an application are exploited in the insertion of prefetch instructions into loops with internal control flow. Cache line reuse patterns across loop iterations are recognized to eliminate unnecessary prefetch instructions. The prefetch insertion algorithm is integrated with other low-level optimization phases, such as loop unrolling, register reassociation, and instruction scheduling. An alternative embodiment of the compiler limits the insertion of explicit prefetch instructions to those situations where the lower bound on the achievable loop iteration latency is unlikely to be increased as a result of the insertion.

17 Claims, 9 Drawing Sheets

OTHER PUBLICATIONS

Gornish, Edward H., et al., "Compiler–Directed Data Prefetching in Multiprocessors with Memory Hierarchies", 1990, Association for Computing Machinery.

Gupta, Anoop, et al., "Comparative Evaluation of Latency Reducing and Tolerating Techniques", 1991, Association for Computing Machinery.

Fu, John W. C., et al., "Data Prefetching in Multiprocessor Vector Cache Memories", 1991, Association for Computing Machinery.

Chen, Tien–Fu, et al., "Reducing Memory Latency via Non–blocking and Prefetching Cahces", 1992, Association for Computing Machinery.

EFFICIENT EXPLICIT DATA PREFETCHING ANALYSIS AND CODE GENERATION IN A LOW-LEVEL OPTIMIZER FOR INSERTING PREFETCH INSTRUCTIONS INTO LOOPS OF APPLICATIONS

BACKGROUND OF THE INVENTION

1. Technical Field

The invention relates to techniques for reducing data cache overhead in a computer system. More particularly, the invention relates to compiler-related techniques that are useful for reducing data cache overhead.

2. Description of the Prior Art

Data cache misses (described in greater detail below) can account for a significant portion of an application program's execution time on modern processors. This is particularly true in the case of scientific applications that manipulate large data structures which run on high frequency processors having long memory latencies. With increasing mismatch between processor and memory, the high penalty of cache misses has become and continues to be a dominant performance limiter of microprocessors. Increasing the cache size is one way to reduce cache misses. However, because the size of many numerical applications is also growing rapidly from generation to generation, the first level cache may not always be large enough to capture critical working sets.

Most modern computer systems employ such caches to bridge the gap between memory and processor speeds. However, despite high cache hit ratios, the cost of cache misses in high frequency processors can significantly degrade run-time performance. To illustrate this point, a plausible scenario has been suggested where a cache miss penalty is 100 processor cycles and a data reference occurs every four cycles. See, for example Alexander C. Klaiber, Henry M. Levy, An Architecture for Software-Controlled Data Prefetching, Proceedings of the 18th Annual International Symposium on Computer Architecture, May 1991. Even assuming a cache hit ratio of 99%, the processor is stalled for memory 20% of the time.

One way to ameliorate the high overhead of data cache misses is to overlap the fetching of data from memory to the data cache with other useful computations. Certain high-performance superscalar microprocessors are able to achieve some degree of overlap between data cache miss handling and processor computation automatically through out-of-order instruction execution, facilitated by instruction queues capable of holding renamed register results, in conjunction with a split-transaction memory bus (e.g. such microprocessors as the Silicon Graphics T5, Hewlett-Packard PA8000, and Sun Ultrasparc). However, the degree of overlap typically achieved is insufficient to fully cover an external data cache miss latency.

Some of these microprocessors support explicit data prefetch instructions that may be used to reduce the high overhead of data cache misses more effectively. Such instructions are typically defined to initiate data cache miss handling without holding up instruction execution until the referenced data is retrieved from memory.

By inserting explicit data cache prefetch instructions into the code stream, a compiler can help ameliorate the high cost of data cache misses. However, this approach must be implemented judiciously because explicit cache prefetch instructions, in general, increase the dynamic path length of an application, and the added overhead may not be offset by a corresponding decrease in data cache miss overhead.

There is much published literature on cache design trade-offs, and hardware approaches to improving cache performance. Comparatively, however, there is much less literature on improving cache performance through software-controlled active cache management. The few papers that discuss software-controlled data prefetching to improve cache performance include Todd C. Mowry, Monica S. Lam, Anoop Gupta, Design and Evaluation of a Compiler Algorithm for Prefetching, Proceedings of the 5th International Conference on Architectural Support for Programming Languages and Operating Systems, October 1992; Alexander C. Klaiber, Henry M. Levy, An Architecture for Software-Controlled Data Prefetching, Proceedings of the 18th Annual International Symposium on Computer Architecture, May 1991 (an approach based on hand analysis); and Software Prefetching, David Callahan, Ken Kennedy, Allan Porterfield, Proceedings of the 4th International Conference on Architectural Support for Programming Languages and Operating Systems, April 1991 (where a prefetch instruction is added for each loop body memory reference without considering or exploiting cache line re-use, such that there is no selectivity; and where the prefetch insertion is performed at the source-code level, such that there is little integration with other compiler optimization phases; additionally, because the analysis is done at the source code level, it is difficult to estimate the prefetch iteration distance (PFID), i.e. the PFID used is always one loop iteration, which may be insufficient to hide the full cache miss latency).

These papers concentrate on explicit prefetches for subscripted variables that are referenced in loops. They do not discuss insertion of explicit prefetch instructions into straight-line code for scalar or indirect memory references. Furthermore, it is generally assumed that the arrays of interest are all aligned on cache line boundaries.

There are some general observations that are more or less common to the different studies of software-controlled data prefetching. One such observation is that data prefetching does not come for free. Specifically, explicit prefetches use up instruction issue bandwidth. In addition to the prefetch instruction itself, typically one or more instructions are needed to compute the address of the memory location to be prefetched. Recycling the computed prefetch address for the actual reference can involve tying up registers for extended lifetimes. The increased register pressure can result in the introduction of spill code in expensive loops. This can offset the expected performance gains due to prefetching.

A simple prefetch strategy, such as the one proposed by David Callahan, Ken Kennedy, Allan Porterfield, Software Prefetching, Proceedings of the 4th International Conference on Architectural Support for Programming Languages and Operating Systems, April 1991, can wastefully increase the number of executed instructions through multiple prefetch requests for lines already in the data cache.

Another important consideration cited by the different papers on software-controlled data prefetching is the actual placement of the prefetch instructions. If a prefetch is issued too close time-wise to the memory reference that needs to access the prefetched data, the prefetched data may not be available in time to avoid a CPU stall. On the other hand, if the prefetch is issued too early, there is a possibility of the prefetched line being displaced from the cache prematurely.

Todd C. Mowry, Monica S. Lam, Anoop Gupta, Design and Evaluation of a Compiler Algorithm for Prefetching, Proceedings of the 5th International Conference on Architectural Support for Programming Languages and Operating Systems, October 1992, discuss the notion of identifying a prefetch predicate and the leading reference amongst multiple references to an array to facilitate selective prefetching. This paper also discusses the interaction of data prefetching with other compiler transformations, specifically cache blocking and software pipelining. The prefetching algorithm disclosed is effective at reducing explicit data prefetch overhead. One shortcoming with this approach is that it relies on reuse and locality analysis that is rather complex. The analysis is done in the context of a high-level optimizer, which makes it difficult to estimate the prefetch iteration distance because the effects of downstream compiler components (e.g. code generator and low-level optimizer) on the loop body are unknown. It is also unclear how cache line alignment of prefetched data structures is accounted for when memory strides are greater than the cache line size. Also, it is unclear whether unnecessary prefetches are inserted for certain types of data reuse patterns. For instance, for the following C code fragment, the disclosed algorithm may actually insert three prefetches when two would be sufficient to ensure full miss coverage.

```
int A[100][100];
for (i = 0; i < 100; i++)
    for (j = 0; j < 100; j++)
    {
        ... A[j-1][i] ...
        ... A[j][i+1] ...
        ... A[j+1][i-1] ...
    }
```

SUMMARY OF THE INVENTION

Assume that a target processor supports a data cache line prefetch instruction with the following characteristics:

- It allows a memory address to be specified much like in an ordinary load or store instruction;
- If the memory referenced by the prefetch instruction is not found in the data cache, the processor causes the referenced memory location to be retrieved from lower levels of the memory hierarchy without stalling the execution of other instructions in the processor's execution pipelines; and
- The processor does not signal an exception even when the memory address specified by a prefetch instruction is invalid.

The current invention provides a new compiler for such a processor that facilitates efficient insertion of explicit data prefetch instructions into loops within application programs. The compiler uses simple subscript expression analysis to determine data prefetching requirements. Analysis and explicit data cache prefetch instruction insertion are performed by the compiler in a machine instruction level optimizer to provide access to more accurate expected loop iteration latency information.

Such a prefetch instruction insertion strategy tolerates worst case alignment of user data structures relative to data cache lines. Execution profiles from previous runs of an application are exploited in the insertion of prefetch instructions into loops with internal control flow. Cache line reuse patterns across loop iterations are recognized to eliminate unnecessary prefetch instructions. The prefetch insertion algorithm is integrated with other low level optimization phases, such as loop unrolling, register reassociation, and instruction scheduling.

An alternative embodiment of the compiler limits the insertion of explicit prefetch instructions to those situations where the lower bound on the achievable loop iteration latency is unlikely to be increased as a result of the insertion.

DETAILED DESCRIPTION OF THE INVENTION

Figure 1:
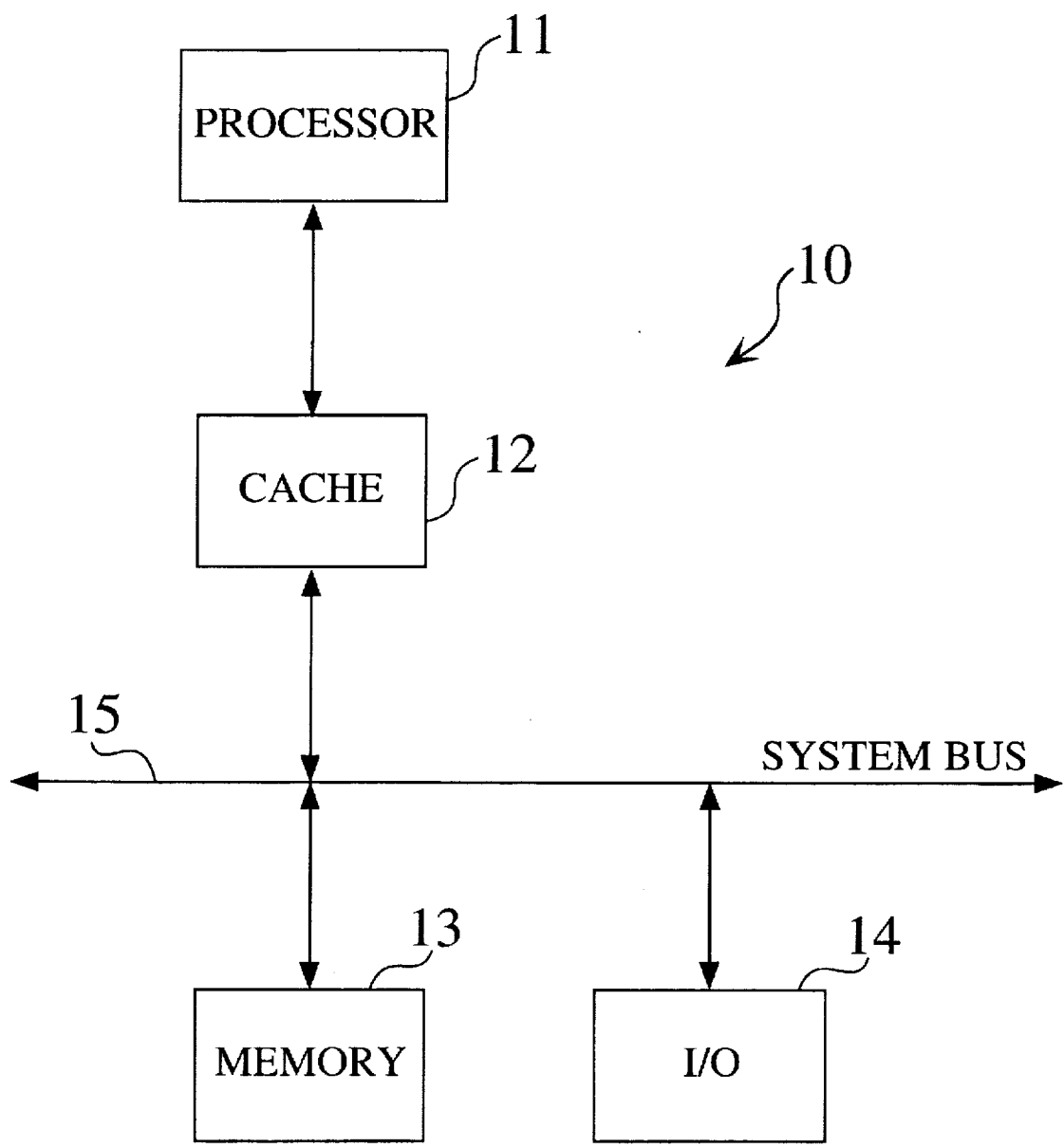
FIG. 1 is a block schematic diagram of a uniprocessor computer architecture including a processor cache.

The invention provides a new compiler that facilitates efficient insertion of explicit data prefetch instructions into loops within applications. FIG. 1 is a block schematic diagram of a uniprocessor computer architecture 10 including a processor cache. In the figure, a processor 11 includes a cache 12 which is in communication with a system bus 15. A system memory 13 and one or more I/O devices 14 are also in communication with the system bus.

Figure 2:
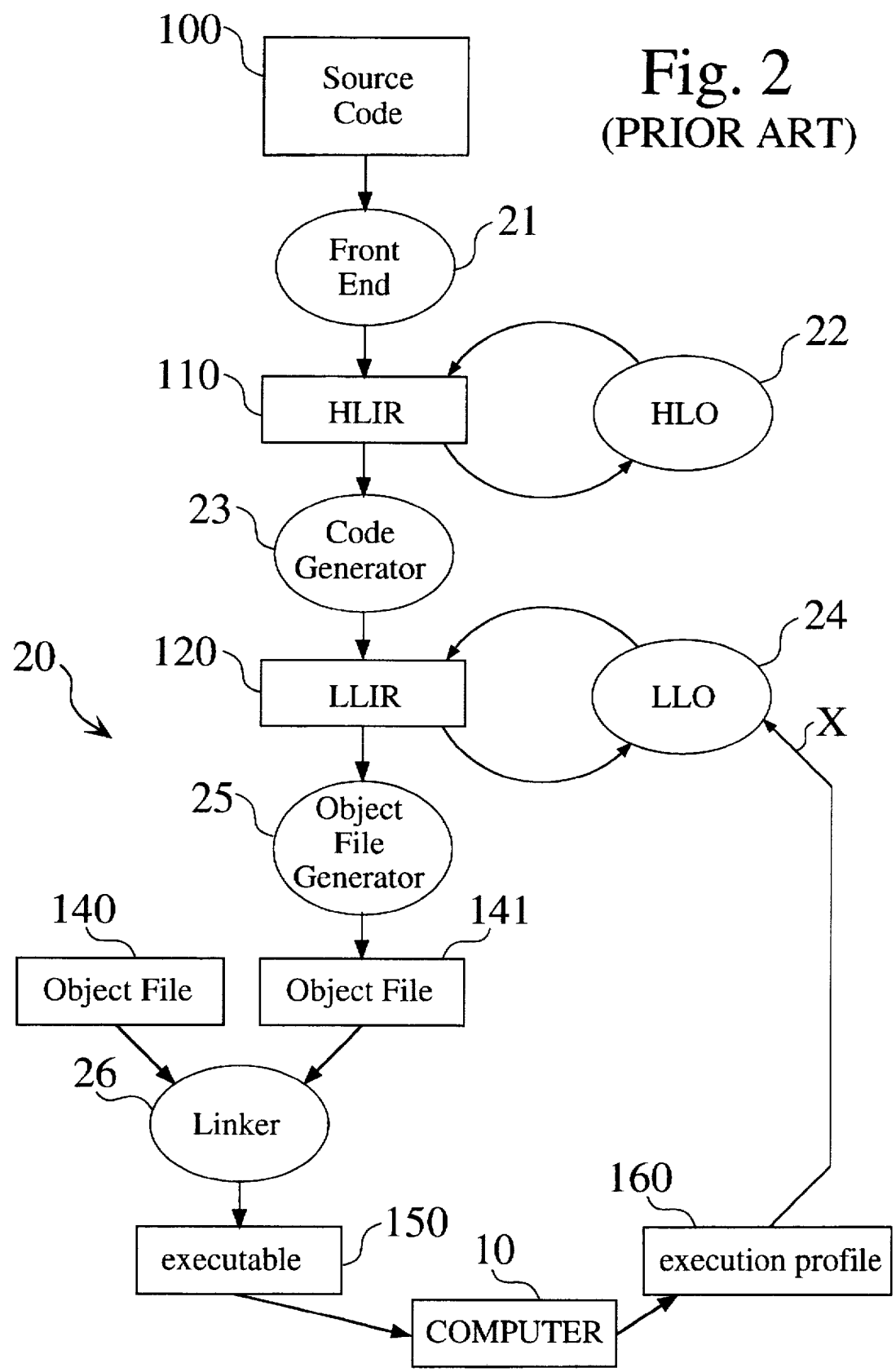
FIG. 2 is a block schematic diagram of a modern software compiler.

FIG. 2 is a block schematic diagram of a software compiler 20, for example as may be used in connection with the computer architecture 10 shown in FIG. 1. The compiler Front End component 21 reads a source code file (100) and translates it into a high level intermediate representation (110). A high level optimizer 22 optimizes the high level intermediate representation 110 into a more efficient form. A code generator 23 translates the optimized high level intermediate representation to a low level intermediate representation (120). The low level optimizer 24 converts the low level intermediate representation (120) into a more efficient (machine-executable) form. Finally, an object file generator 25 writes out the optimized low-level intermediate representation into an object files (141). The object file (141) is processed along with other object files (140) by a linker 26 to produce an executable file (150), which can be run on the computer 10. In the invention described herein, it is assumed that the executable file (150) can be instrumented by the compiler (20) and linker (26) so that when it is run on the computer 10, an an execution profile (160) may be generated, which can then be used by the low level optimizer 24 to better optimize the low-level intermediate representation (120). The compiler 20 is discussed in greater detail below.

in contrast to previous approaches to the cache miss problem discussed above (see Todd C. Mowry, Tolerating Latency Through Software-Controlled Data Prefetching, PhD Thesis, Dept. of Electrical Engineering, Stanford University, March 1994; D. Callahan, K. Kennedy, A. Porterfield, Software Prefetching, Proceedings of the Fourth International Conference on Architectural Support for Programming Languages and Operating Systems, pp. 40–52, April 1991; and W. Y. Chen, S. A. Mahlke, P. P. Chang, W. W. Hwu, Data access microarchitectures for superscalar processors with compiler-assisted data prefetching, Proceedings of Microcomputing 24, 1991) the new compiler has the following unique attributes:

- Simple subscript expression analysis is used to determine data prefetching requirements, as opposed to sophisticated reuse/dependence analysis.
- Subscript expression analysis and explicit data cache prefetch instruction insertion are performed by the compiler in a low-level, i.e. machine instruction level, optimizer. A principal advantage of this approach is access to more accurate expected loop iteration latency information.
- The prefetch instruction insertion strategy tolerates worst case alignment of user data structures relative to data cache lines.
- Execution profiles from previous runs of an application are exploited in the insertion of prefetch instructions into loops with internal control flow.
- Cache line reuse patterns across loop iterations are recognized to eliminate unnecessary prefetch instructions.
- The prefetch insertion algorithm is integrated with other low level optimization phases, such as loop unrolling, register reassociation, and instruction scheduling.

An alternative embodiment of the new compiler also limits the insertion of explicit prefetch instructions to those situations where the lower bound on the achievable loop iteration latency is unlikely to be increased as a result of the insertion.

The new compiler yields significant performance improvements for some industry-standard performance benchmarks on simulations of the Hewlett-Packard Company (Palo Alto, Calif.) PA-8000 processor.

The following discussion explains compiler operation in the context of a loop within an application program. Loops are readily recognized as a sequence of code that is iteratively executed some number of times. The sequence of such operations is predictable because the same set of operations is repeated for each iteration of the loop. It is common practice in an application program to maintain an index variable for each loop that is provided with an initial value, and that is incremented by a constant amount for each loop iteration until the index variable reaches a final value. The index variable is often used to address elements of arrays that correspond to a regular sequence of memory locations. Such array references by a loop constitute a significant portion of cache misses in scientific applications.

In the compiler, it has been found that the low level optimizer component of a compiler is in a good position to deduce the number of cycles required by a stretch of code that is repetitively executed. As discussed above, the concept of prefetching is not new.

Nonetheless it is helpful to explain prefetching at this point. For example, assume that the time that it takes to get a data item back from main memory to cache is 100 cycles, during which time, the processor must wait idly before it can operate on the data. To avoid wasting idle processor cycles on account of data cache misses, it it is desirable to initiate retrieval of data that is not likely to be found in the cache, in advance of such data being needed by the processor. The compiler can predict which data is needed in advance for loops that access array elements in a regular fashion. The compiler can then insert prefetch instructions into loops such that array elements that are likely to be needed in future loop iterations are retrieved from memory ahead of time. Ideally, the number of iterations in advance that array elements are prefetched is such that by the time the array element is actually required by the processor, the array element is retrieved from memory and placed in the data cache (if it was not there to begin with).

In prior art approaches to prefetching, cache alignment is a problem. Another known problem is the overhead of the prefetch instruction itself. These are very important problems. Run time array dimensioning is yet another problem that must be addressed.

Figure 3:
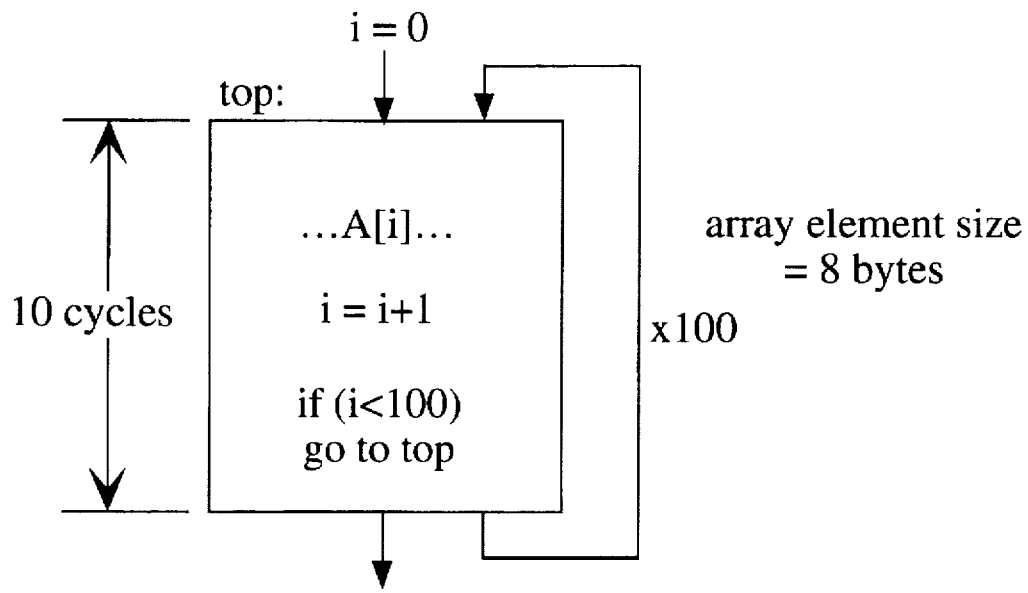
FIG. 3 is a schematic representation of a loop.
Figure 4:
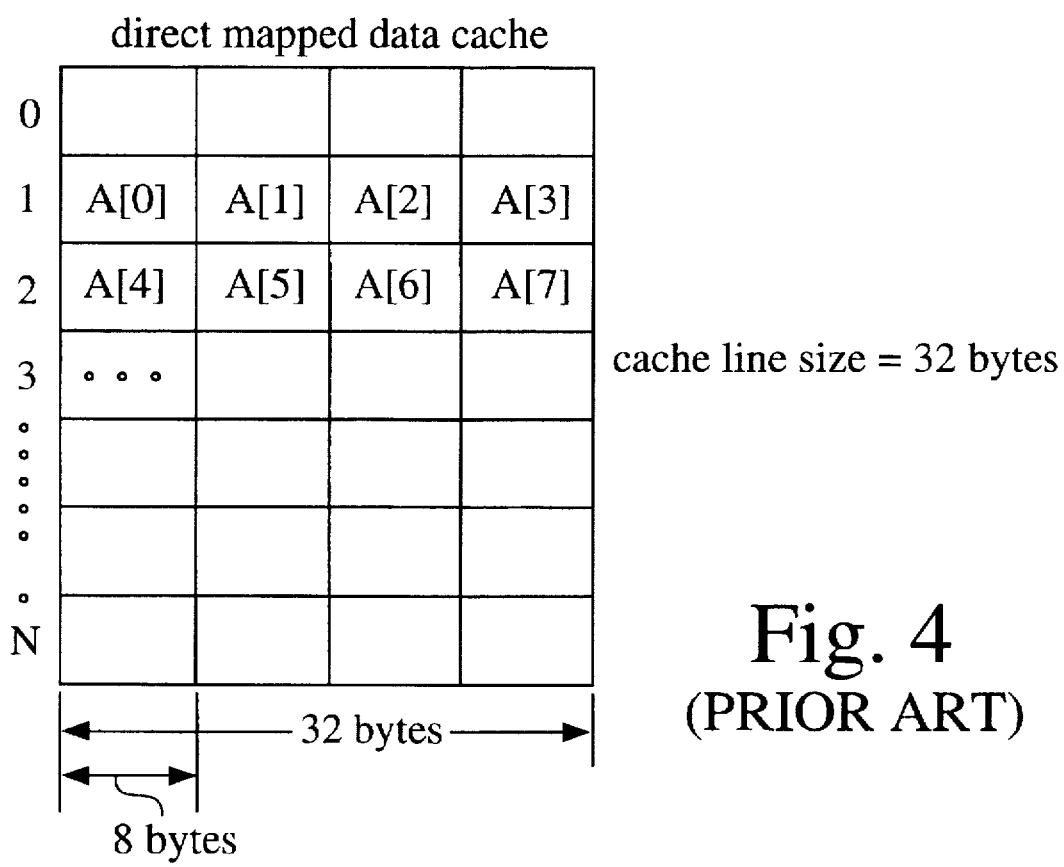
FIG. 4 is a schematic representation of a direct mapped data cache.

For example, in FIG. 3 a loop is shown that has a loop execution time of 10 cycles and that iterates 100 times, accessing an 8-byte array element on each iteration. If there are no cache misses, the total loop execution time is 1000 cycles. In FIG. 4, a direct mapped data cache is shown where the cache line size is 32 bytes, each line capable of holding 4 contiguous 8-byte array elements. For the loop of FIG. 3, it is assumed that a cache miss occurs every fourth iteration (on every cache line crossing), which means that 25 data cache misses will occur for the whole loop. If it takes 40 cycles to service each cache miss, the total loop execution time becomes 2000 cycles, i.e. 1000 cycles for just executing the loop instructions +25×40 cycles, or another 1000 cycles, for the cache misses.

Figure 5:
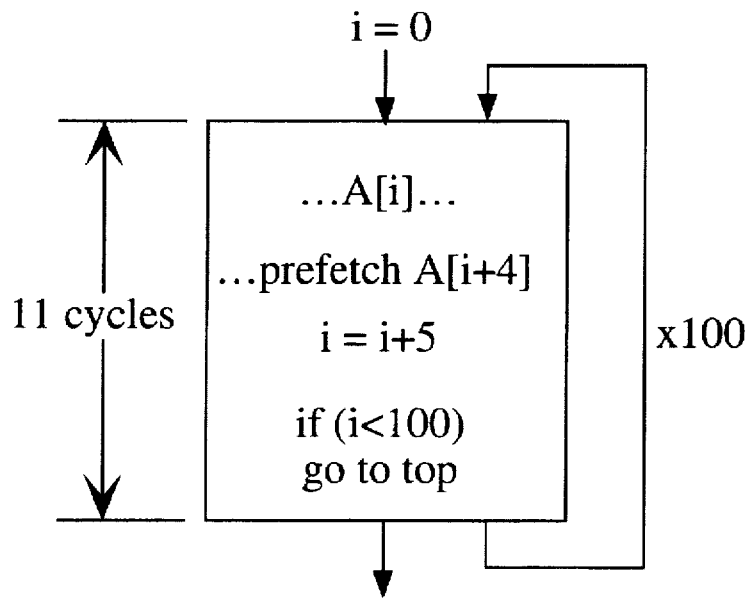
FIG. 5 is a schematic representation of a loop, including a prefetch instruction.

If known prefetch techniques are used, then for the example of FIGS. 3 and 4 cache misses can be covered if a prefetch distance of four is chosen. In FIG. 5, a prefetch instruction is shown inserted into the loop of FIG. 3. As can be seen, the use of a prefetch instruction can eliminate most cache misses, thereby saving significant execution time. However, a prefetch instruction requires execution time. In the example herein, each iteration of the loop requires a prefetch instruction, which can be assumed to take an extra cycle. Therefore, for a loop that iterates 100 times, 100 cycles must be added to the execution time to account for prefetching.

Additionally, the first iteration of the loop incurs a cache miss, which in the example herein requires 40 cycles. Accordingly, prefetching avoids most cache misses, such that execution time is reduced to 1140 cycles, i.e. 1000 cycles to execute the original loop instructions +100 cycles for the prefetch instructions+40 cycles for the initial cache miss before the first prefetch instruction is executed. Thereafter, the prefetch instructions overlap the 40-cycle data cache miss service time with the execution of four (11-cycle) loop iterations.

Unfortunately, each time through the loop a new prefetch instruction is executed. Where the unit of transfer between the main memory and the cache is a cache line, some of the prefetches are redundant because a prefetch for a particular array location may refer to the same cache line as the prefetch for subsequent array locations. This redundancy occurs because there are adjacent array locations in the same cache line, and the system is issuing a redundant instruction to the memory system to retrieve the same cache line multiple times. Typically, computer systems that support this type of prefetch instruction track the instructions to determine if a requested address to prefetch a cache line matches a later prefetch to the same cache line. In such event, the second prefetch request to main memory is dropped.

However, even though redundant prefetches typically get dropped, it is nonetheless important that prefetch instructions that refer to the same cache line are not executed multiple times because the prefetch instruction itself takes up some compute time. The processor must fetch and execute the prefetch instruction, understand what data address the instruction refers to, and then access the data cache to check if the data are already cache-resident.

Note that the compiler is responsible for inserting prefetch instructions into a loop body that specify the memory address of data items that will be accessed in the future. The memory address is determined based on the number of loop iterations in advance (i.e. the prefetch iteration distance or PFID) that data items need to be prefetched to fully hide the time required to service potential data cache misses. The PFID is determined taking into account the nature of the loop body instructions and characteristics of the target processor and memory system. For instance, for a "short" loop, e.g. one that takes only two cycles per iteration to execute, the PFID would need to be 50 in order to accomodate a 100-cycle data cache miss latency.

The key to efficient data prefetching then is to overlap the computer's execution of the instructions in a piece of code, such as a loop, with the time it takes to retrieve the data from the memory and place it to the processor cache, and do this in a way that avoids redundant prefetches.

Ideally, cache miss overhead is completely eliminated by inserting prefetch instructions judiciously. Referring back to the example above where the loop executes 100 iterations, with each iteration taking 11 cycles each (10 cycles for the original loop body instructions +1 cycle for the prefetch instruction +40 cycles for an initial cache miss before prefetching starts), the time it takes to run the loop is only 1140 cycles, which is much better than the 2000 cycles of the example above in FIG. 4.

However, 1140 cycles is still not quite as good as 1000 cycles. One way to increase further the savings in processor execution time is by using a well known technique referred to loop unrolling. In loop unrolling, the body of the loop is replicated. This reduces the number of times the loop is executed by a factor that is equal to the number of replications, although each time the code is executed there are more instruction to exectue. Thus, in loop unrolling exactly the same amount of work is accomplished, but the loop is now reorganized.

Note however, that because the loop closing branch doesn't not have to be replicated as many times as the loop body is unrolled (in fact an unrolled loop typically needs just one loop-closing branch), loop unrolling can by itself result in improved performance.

Figure 6:
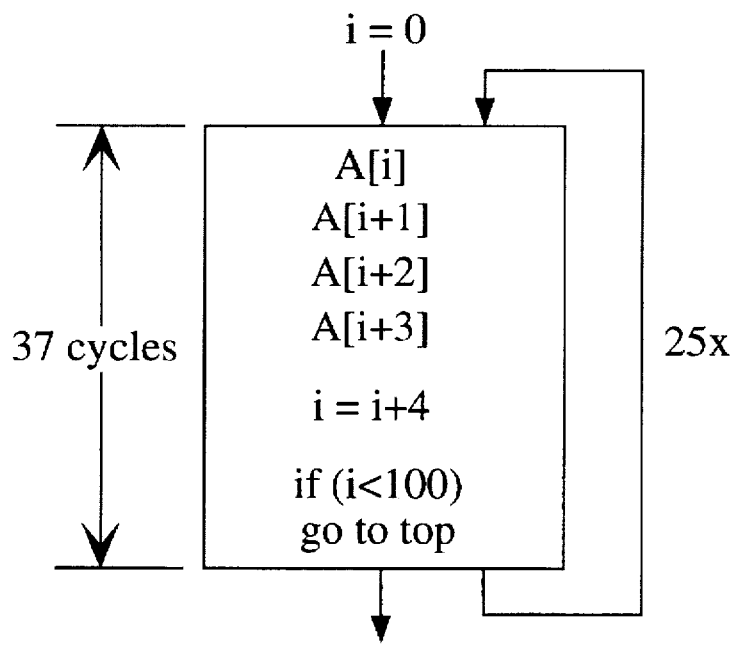
FIG. 6 is a schematic representation of a loop that has been unrolled four times.

For example, FIG. 6 shows the loop of FIG. 3 after the loop has been unrolled four times. Thus, instead of executing the loop 100 times, the loop is executed 25 times. Assume that a loop-closing branch takes 1-cycle to execute. Each iteration in the unrolled loop would then require 37 cycles (4×9 cycles +1 cycle) and the total loop execution time is equal to (25 iterations×37 cycles)+(25 iterations×40 cycles/ cache miss)=1925 cycles.

In the context of the invention and per the example above, if each iteration of the unrolled loop requires 37 cycles, where the loop is unrolled four times, it is necessary to prefetch data two iterations ahead (since 1 iteration ahead is insufficient to accomodate a 40 cycle cache miss latency). If the prefetch instruction is put at the bottom of the loop, then the loop is executed before a prefetch is performed. This does not provide optimum operation of the loop. Thus, the placement of the prefetch instruction is critical. It is therefore necessary to place the prefetch instruction at a point that provides sufficient time for a prefetch before the loop completes execution. For example, if the prefetch is placed at the top of the loop, then the loop does the same amount of work, but more effectively overlaps the time to service a possible data cache miss for subsequent iterations with the computation performed in the current iteration.

Figure 7:
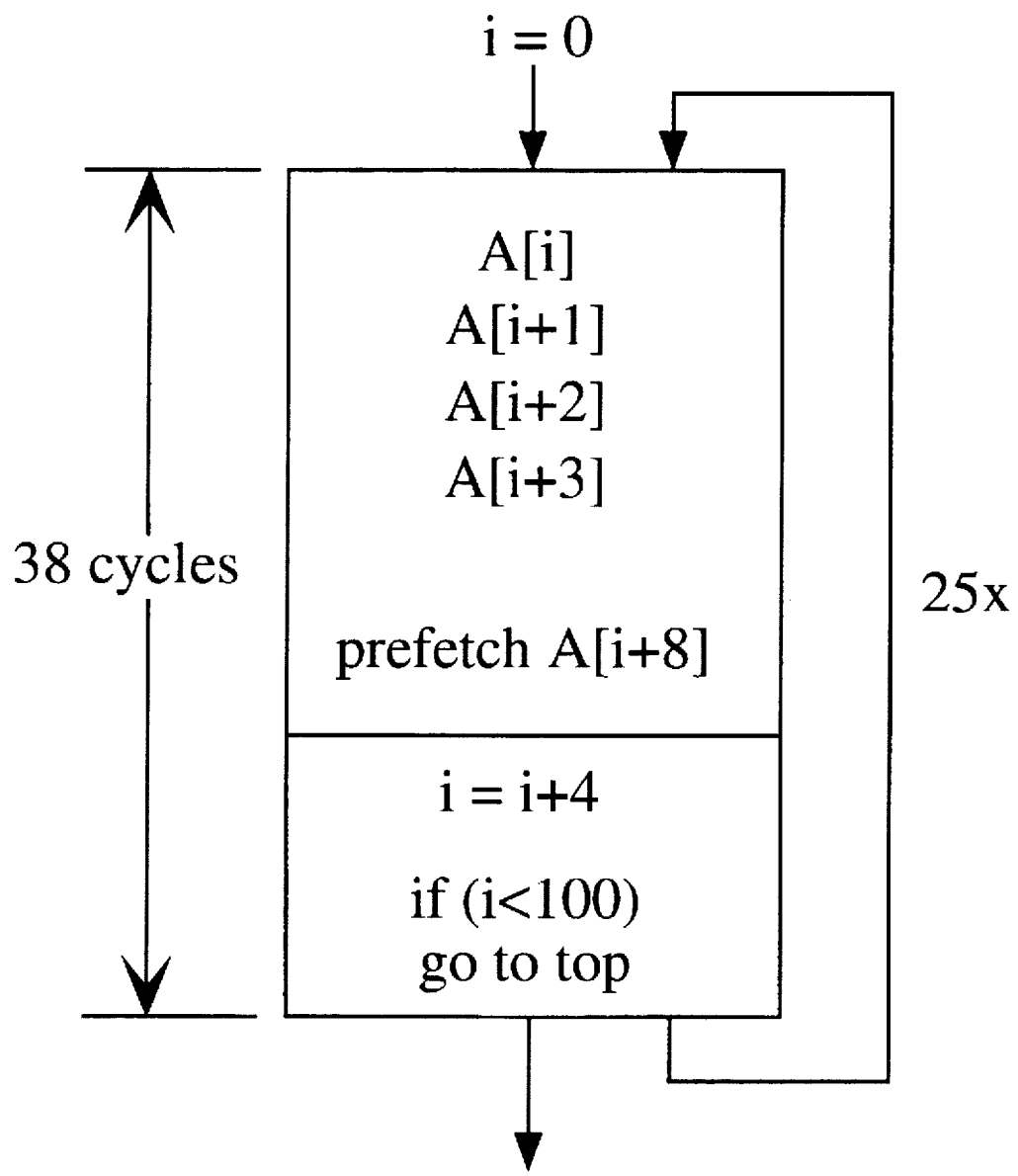
FIG. 7 is a schematic representation of an unrolled loop, including a prefetch instruction.

For the example above, where there are 100 iterations of a 10-cycle loop that takes a total of 1000 cycles, the prefetch instructions cost 100 cycles +a 40 cycle cache miss for the first iteration. As a result, the execution of the loop is reduced from 2000 cycles to 1140 cycles. By adding loop unrolling, in this example where the loop is unrolled by a factor of four (see FIGS. 6 and 7), each iteration of the loop may take 38 cycles (37 cycles+1 cycle for the prefetch instruction). Thus, execution time for the loop is equal to 38 cycles×25 iterations+80 cycles for two cache misses before prefetching begins =1030 cycles. Thus, it is clear that the techniques disclosed herein produce a substantial improvement in the execution time for a loop.

Note that in some cases the prefetch instruction may not cost any additional cycles to execute. This is because many modern processors are superscalar, i.e. they can execute multiple instructions in one cycle, e.g. a load with an add. Prefetch instructions are similar to a load because they refer to memory. Thus, if there are several adds in a loop, adding one extra prefetch does not increase the time necessary to execute each iteration of the loop because the prefetch instruction is executed in parallel with the add instruction.

One important feature of the invention identifies loops and access patterns to allow a determination of how many cycles are devoted to loop iterations, and therefore allows insertion of the prefetch instruction to a location of an array that is sufficiently far in advance to make sure that the miss time is minimized. One problem is that loops can be coded in many different ways. It is therefore necessary to recognize different types of loops. For example, there are some loops that are not always handled by prefetching.

In the invention, the compiler translates the higher level application into an instruction stream that the processor executes, where the compiler inserts prefetches at opportune points into the instruction stream that effects data retrieval from main memory into the cache in advance of when that data item is actually needed. The compiler anticipates that a particular data item is going to be needed at a particular time, rather than letting the processor execute blindly until it gets to that point in time, where the processor stalls and waits for several dozens of cycles until that item is fetched from main memory.

One advantage in letting the processor continue executing the other instructions which may have nothing to do with memory is that the system can achieve an overlap. While the access time between processor and cache is typically 1 to 5 cycles, the retrieval time from cache to memory is often on the order of 10 to 100 cycles. When the processor actually gets to the point where the data item is needed, it is not necessary to wait for a cache miss that takes 100 processor cycles. Thus, instead of waiting 100 processor cycles, it may only be necessary to wait for 20 cycles because 80 cycles worth of look up time is hidden or overlapped with the previous execution.

The invention is preferably implemented in the low level optimizer of the compiler to insert prefetch instructions at opportune points in the code. In particular, the invention inserts prefetch instructions into loops. One advantage of inserting prefetch instructions into loops is that the data reference pattern of a loop tends to be regular and the compiler is better able to predict the kind of memory items that are likely to be required in the future, where the future is not the current iteration of the loop, but five or six iterations in the future. As discussed above, this depends on the characteristics of the instructions found within the loop. It is therefore necessary to vary the point in time that the prefetch request is actually issued, based on the expected latency of a loop iteration.

The compiler is the piece of software that translates source code, such as C, BASIC, or FORTRAN, into a binary image that actually runs on a machine. Typically the compiler consists of multiple distinct phases, as discussed above in connection with FIG. 2. One phase is referred to as the front end, and is responsible for checking the syntactic correctness of the source code. If the compiler is a C compiler, it is necessary to make sure that the code is legal C code. There is also a code generation phase, and the interface between the front-end and the code generator is a high level intermediate representation. The high level intermediate representation is a more refined series of instructions that need to be carried out. For instance, a loop might be coded at the source level as:

for(I=0, I<10, I=I+1), which might in fact be broken down into a series of steps, e.g. each time through the loop first load up I and check it against 10 to decide whether to execute the next iteration. A code generator takes this high level intermediate representation and transforms it into a low level intermediate representation. This is much closer to the actual instructions that the computer understands. In terms of improving the quality of the intermediate representations, a low level intermediate representation generated by a code generator is typically fed into a low level optimizer.

An optimizer component of a compiler must preserve the program semantics (i.e. the meaning of the instructions that are translated from source code to an high level intermediate representation, and thence to a low level intermediate representation and ultimately an executable file,) but may rewrite or transform the code in a way that allows the computer to execute an "equivalent" set of instructions to be executed in less time.

Modern compilers are structured with a high level optimizer (HLO) that typically operates on a high level intermediate representation and substitutes in its place a more efficient high level intermediate representation of a particular program that is typically shorter. For example, an HLO might eliminate redundant computations.

With the low level optimizer (LLO), the over-arching objectives are largely the same as the HLO, except that the LLO operates on a representation of the program that is much closer to what the machine actually understands. Uniquely, the invention performs prefetch analysis and prefetch instruction generation in the context of a low level optimizer. At this level there are not any semantic annotations, but merely instructions, such as add, load, and store. The compiler herein identifies repetitive code segments, such as loops, for prefetch instruction generation in the context of a low level optimizer.

The analysis that the compiler herein uses is simpler than that of the prior art. Additionally, because the invention operates in the context of a low level optimizer on raw instructions, it is much easier to estimate how many processor cycles a loop iteration requires, and therefore how many iterations in advance a data prefetch instruction should be inserted into the code.

There are many different organizations that are possible for a data cache, but one possible organization that is not all that uncommon is to organize it in terms of a series of direct-mapped cache lines. Each cache line might be able to hold up to 32 bytes of data, such that the unit of transfer between main memory and the cache is in chunks of 32 bytes. The processor can make a request to the memory system, and thence data is placed into a well defined location in the cache to allow the processor to retrieve the data from that location. If the cache in this example is 32,000 bytes in size, then it has 1000 lines, each line holding 32 bytes. Any explicit data prefetching compiler ultimately has to insert the hardware prefetch instructions into the low level code representation. One distinguishing feature of the current invention is that the analysis required to insert prefetch instructions efficiently is also done in the context of a low level optimizer. Moreover, the prefetch instruction insertion is done a manner that is synergistic with other low level optimization, such as loop unrolling, register reassociation, and instruction scheduling.

Figure 8:
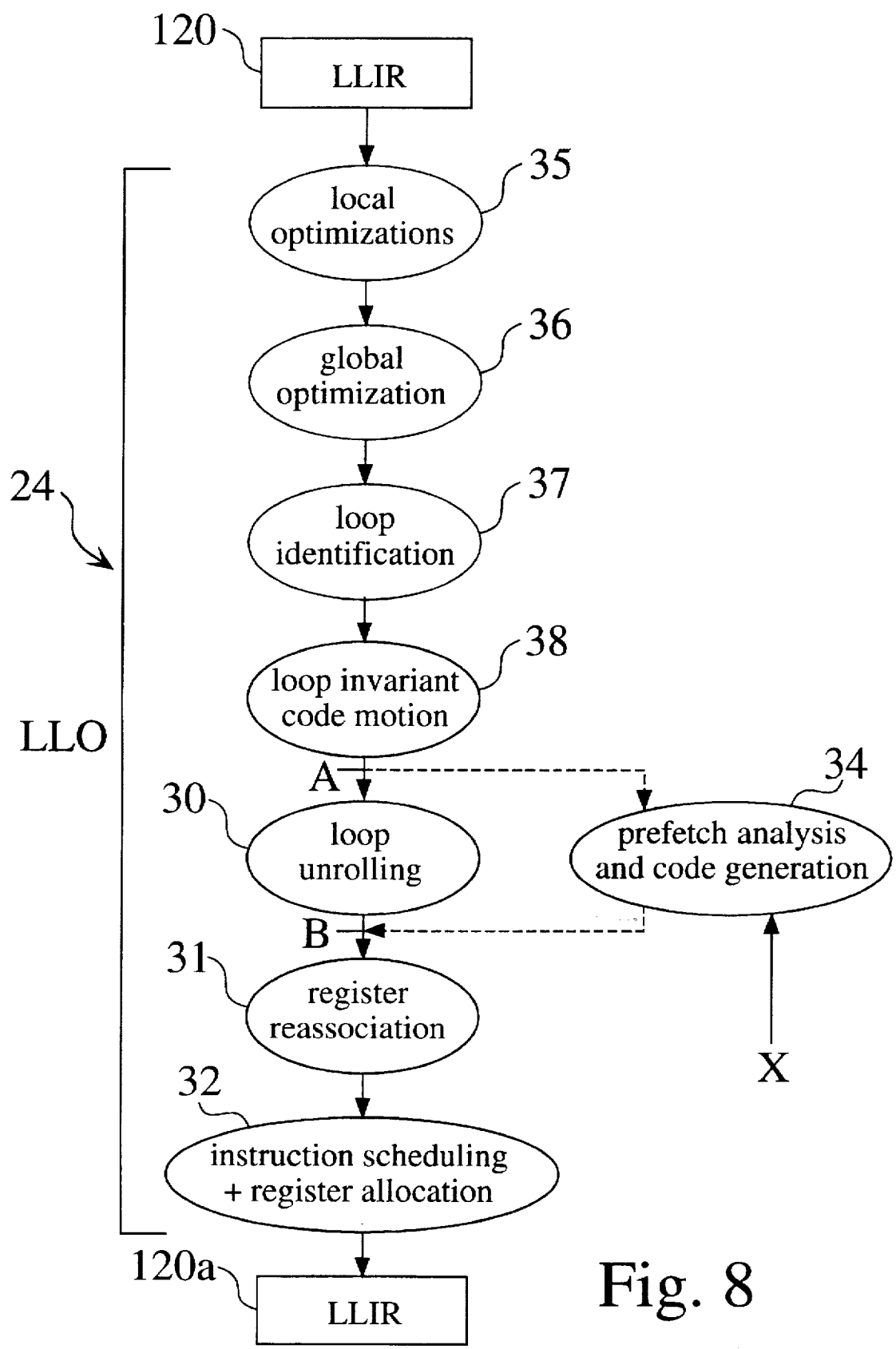
FIG. 8 is a block diagram showing a low level optimizer for a compiler, including a prefetch driver according to the invention.

The invention herein resides within the domain of the low level optimizer 24. FIG. 8 is a block diagram showing a low level optimizer for a compiler, including a prefetch driver 34 according to the invention.

The low level optimizer 24 in accordance with the preferred embodiment of the invention may include any combination of known optimization techniques, such as those that provide for local optimization 35, global optimization 36, loop identification 37, loop invariant code motion 38, loop unrolling 30, register reassociation 31, and instruction scheduling 32. The invention provides a prefetch driver 34 that operates in concert with such known techniques.

The following pertains to the various elements of the low level optimizer shown on FIG. 8.

Local optimizations include code improving transformations that are applied on a basic block by basic block basis. For purposes of the discussion herein, a basic block corresponds to the longest contiguous sequence of machine instructions without any incoming or outgoing control transfers, excluding function calls. Examples of local optimizations include local common subexpression elimination (CSE), local redundant load elimination, and peephole optimization.

Global optimizations include code improving transformations that are applied based on analysis that spans across basic block boundaries. Examples include global common sub-expression elimination, dead code elimination, and register promotion that replaces loads and stores with register references Loop identification is the process of identifying sections of code that get executed repetitively (typically this is done through interval analysis).

Loop invariant code motion is the identification of instructions located with a loop that compute the same result on every loop iteration and the re-positioning of such instructions outside the loop body.

Register allocation and instruction scheduling is the process of assigning hardware registers to symbolic instruction operands and the re-ordering of instructions to minimize run-time pipeline stalls.

Figure 9:
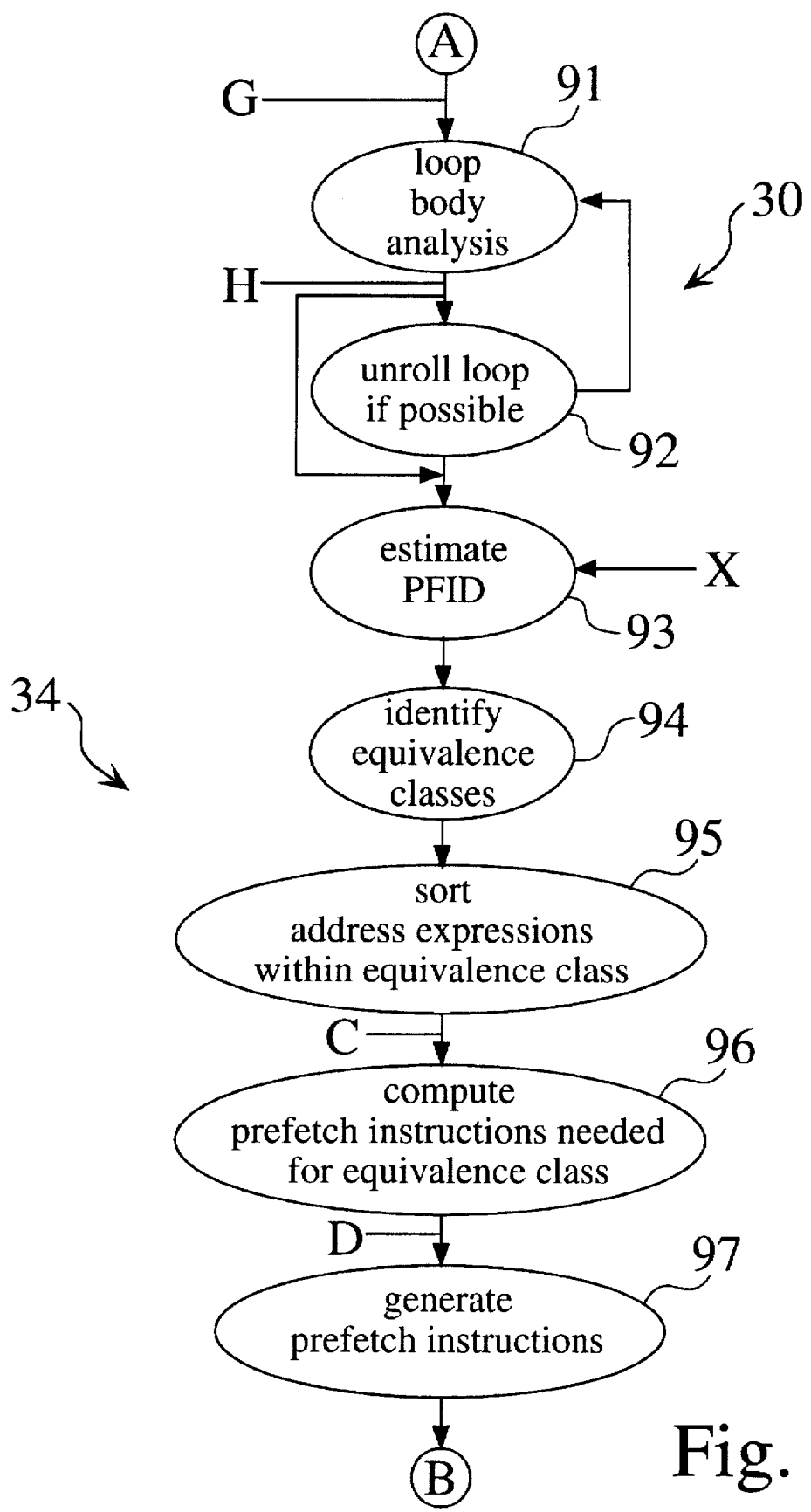
FIG. 9 is a block diagram of a prefetch driver according to the invention.
Figure 10:
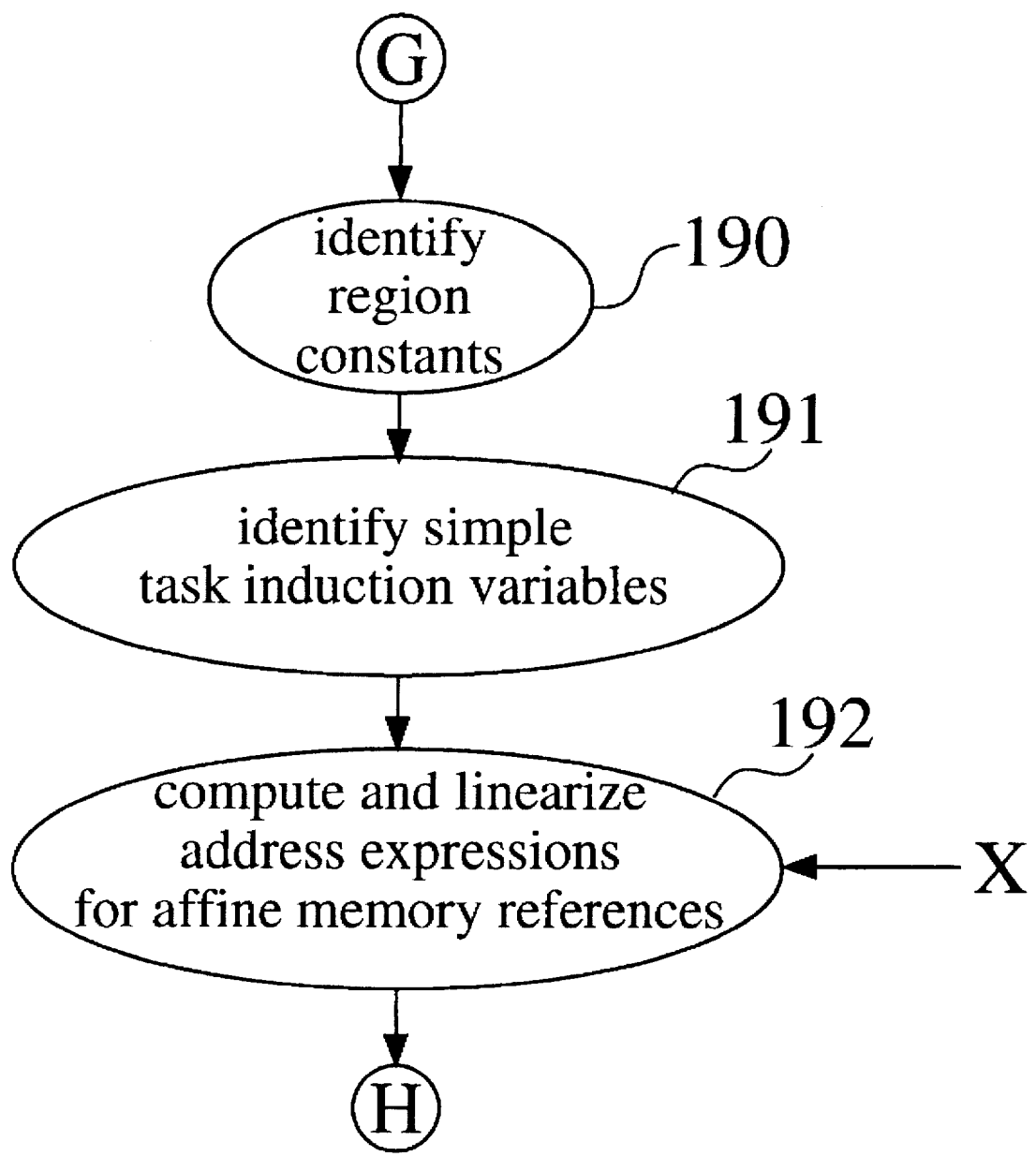
FIG. 10 is a block diagram of a loop body analysis module according to the invention.

FIG. 9 is a block diagram of a prefetch driver according to the invention. In the figure, code within the low level optimizer (numeric designator 24 on FIG. 8) is supplied to the prefetch driver 34. This is shown in the context of the low level optimizer of FIG. 8 by points A and B on the figure, which points are also shown on FIG. 9 to reference the prefetch driver 34 between both of FIGS. 8 and 9. Loop unrolling may be incorporated into the invention and is shown on FIG. 9 as a module that unrolls the loop a selected number of times 92. Loop body analysis 91 is discussed in greater detail below in connection with FIG. 10.

The prefetch driver estimates the prefetch distance 93 and then partitions the memory references occurring in each loop into disjoint equivalence classes 94 based on the symbolic address expression. Address expression are sorted within each equivalence class 95 and prefetch instructions that are necessary for each equivalence class are calculated 96. Finally, the prefetch instructions are generated 97. A stream of code produced by the prefetch driver includes both the low level intermediate representation and prefetches that have been inserted into the intermediate representation in accordance with the invention herein.

The following detailed description pertains to the various modules shown on FIG. 9:

1. Loop body analysis (see FIG. 10, on which the letters G and H correspond to the same letters on FIG. 9):

a. Identify region constants 190. These are pseudo-registers (symbolic instruction register operands) that are only used and not defined in the loop body. For the purposes of prefetching analysis, only integer region constants are of importance.

b. Identify simple basic loop induction variables 191. A simple basic induction variable (BIV) is a pseudo-register whose loop body definitions can all be expressed in the form:

BIV=BIV+biv_delta where "biv_delta" is any arithmetic expression involving only pure or region constants. In the example below, the variable "k" is a region constant, and the variable "i" is a BIV, with a single loop body definition whose "biv_delta" term corresponds to (2*k).

```
k = ...
i = ...
loop
    i = i + (2 * k)
end_loop
```

The net loop increment for a BIV is the total amount by which the BIV is incremented on every loop iteration.

A BIV is said to have a well-defined loop increment if the total amount by which the BIV is incremented is the same on every loop iteration. The BIV loop increment in this case is simply the sum of the "biv_delta" values associated with each of its loop body definitions.

Note that a BIV with conditional loop body definitions does not have a well-defined loop increment.

c. Compute and linearize address expressions for memory references 192. This involves first identifying the address expression associated with memory references. Typically this is done by recursively tracing back the reaching definitions for the register operands of base-relative and indexed loads and stores that appear in the loop body, and constructing a binary address expression tree, where the internal tree nodes represent simple arithmetic operations (+,−,*) and the leaf nodes represent either a pure constant, a region constant, or a BIV. The traceback terminates unsuccessfully when a non-BIV register operand has multiple reaching definitions or when the address expression can not be expressed as a simple binary expression tree for any other reason. Memory references whose memory address can not be expressed as such a binary expression tree are not further considered for prefetching purposes.

The address expression tree is then linearized, if possible, with respect to a unique BIV, meaning that it is re-written into the form:

a_exp * BIV +b_exp where "a_exp" and "b_exp" are themselves arithmetic expressions involving just sum terms each of which is a product involving either literal or region integer constants. The "BIV" term refers to the value of the basic induction variable at the top of the loop entry basic block (the basic block that is the target of the branch representing the back edge of the loop).

An address expression that can be linearized in this manner is considered to be "affine". The "a_exp" term of an affine address expression multiplied by the BIV's net loop increment is also referred to as the memory stride. Also, associated with each such memory reference is a memory data size that can be inferred from the memory reference opcode e.g. a full-word load would be considered to have a data size of 4-bytes.

Memory references with affine address expressions involving a BIV with a well-defined net loop increment that is a compile-time constant and whose "a_exp" term is non-zero are the only memory references that are further analyzed for data prefetching purposes.

In the example below containing indexed references to 4-byte integer arrays, A, B, C, and D,

```
k = ...
loop
    ... A[i + 4] ...
    ... B[2*i − 2*k + 8] ...
    ... C[D[i]] ...
    i = i + 1
end_loop
``` the variable "i" is a BIV and the address expressions associated with the references to A, B, and D would be considered affine, since their memory addresses can be expressed as:

(4) * i+(16+&A[0])

(8) *i+(32−8*k+&B[0])

(4) *i+(&D[0])

respectively, where the notation, "&X[0]" refers to the region constant variable that represents the address of the zero'th element of array X.

Note, however that the address expression associated with the reference to array C is not considered affine.

2. Unroll the loop if possible:

a. Compute maximum prefetch unroll factor U. The objective here is to determine the largest unroll factor U that can be used to minimize prefetch instruction overhead without causing memory strides that are less than or equal to the data cache line size to exceed the data cache line size.

The maximum prefetch unroll factor, U is computed as follows:

U=loop unroll factor computed by other criteria (e.g. loop body size, expected trip count, trip count divisibility etc.)

For each affine address expression reference associated with a BIV with a well-defined constant net loop increment "net_loop_delta" do

```
{
    memory_stride = a_exp * net_loop_delta
    if (memory_stride is a compile-time constant &&
        ABS(memory_stride) <= cache_line_size)
    {
        u = cache_line_size/(ABS(memory_stride))
        U = minimum (U, u)
``` b. If U>1, then unroll loop body U times and repeat loop analysis (steps a-c) on unrolled loop body.

3. Estimate the minimum required prefetch iteration distance (PFID):

The prefetch iteration distance is the number of loop iterations in advance that data should be prefetched to have the data be available in the cache when it is needed by the processor, assuming the data was not in the cache to begin with. The PFID is computed based on the expected cache miss latency and the minimum resource-constrained latency for each loop iteration as follows:

PFID=ceiling (avg_miss_latency/avg_loop_iteration_latency)

There are two competing constraints with regard to the PFID choice:

First, the PFID should be sufficiently large to hide the expected average cache miss latency.

Secondly, the PFID should not be so large that the prefetched data is displaced from the cache by an intervening colliding memory reference before it is actually referenced.

It is difficult to determine the optimum average expected memory latency. While the best-case round-trip memory access latency on one system may be, for example about 50 cycles, it is likely to be different on another system that uses a slower bus. Furthermore, bus contention and memory bank conflicts tend to increase the memory access latency.

Nevertheless, the average miss latency is heuristically estimated as the minimum number of processor cycles that elapse between the time a request is sent by the processor to the data cache and the time the data is forwarded to the processor, assuming the data was not present in the cache.

Estimating the average loop iteration latency is even harder to do, even for single-basic block loops. Until scheduling and register allocation are performed, it is not possible to know for sure how many cycles a loop iteration is going to take. Because it is expensive and difficult to compute the achievable loop iteration latency precisely, a lower bound on the achievable loop iteration latency based on machine resource usage is computed instead. This is quite effective for superscalar processors that execute instructions out-of-order and are able to overlap operation latencies at run-time. Typically for such machines, instruction retirement bandwidth constrains the execution cycle count the most. Thus, by focusing on the retirement bandwidth requirements of the instructions present in the loop body, a lower bound on the achievable loop iteration latency can be computed.

Certain instructions that are likely to be eventually deleted should be ignored in computing the loop iteration latency estimate. These may include register-to-register move instructions, subscript instructions that may be eliminated by reassociation, and floating-point multiplies and adds that may be fused into floating-point multiply-and-accumulate instructions.

For instance, suppose a target out-of-order processor can retire two memory instructions and two ALU or floating-point operations per cycle and suppose the loop body code consists of:

5 memory operations,
6 ALU operations and
7 floating-point operations and that three of the ALU operations participate in addressing expressions that are likely to be eliminated through register reassociation. The lower-bound on the loop iteration latency would then be 5 cycles computed as the larger of 5/2 and ((6-3)+7)/2.

Now, it is also necessary to address the issue of loops that have internal branches. The minimum loop iteration latency for such loops is estimated by using previously collected execution profile information, which indicates the execution count for each basic block in the loop body. The minimum cycle count for each basic block is computed based on the retirement constraints for the instruction mix within the basic block.

The minimum cycle count is summed over each basic block that is executed more than half as many times as the loop entry node to yield an estimate for the minimum loop iteration latency.

4. Identify equivalence classes:

To decide the sort of explicit prefetch instructions to insert into the loop body, uniformly generated equivalence classes of memory references are first identified. These are basically disjoint sets of memory references whose address expressions are known to differ by a compile-time constant. This is done to help clearly detect group spatial and group temporal locality among the different memory references, which in turn can help reduce the prefetch instruction overhead.

Place each affine address expressions associated with a BIV with a compile-time constant net loop increment in a distinct group such that all address expressions within a group share the following properties:

they are all associated with the same BIV they all have the same "a_exp" term their "b_exp" terms differ by a compile-time constant The following algorithm is used to do this:

- let the set of uniformly generated equivalence classes, UGEC = { }
- add each affine address expression E(biv,a_exp,b_exp), to a work list W.
repeat
{
- remove an address expression Ei(biv, a_exp, b_exp) from the work list, W

- compute the memory stride M for Ei as (a_exp * net biv loop increment)

- if M is not a compile-time constant then substitute some fixed constant, C for each non-compile-time constant pseudo-register P, that occurs in M and compute the constant-folded memory stride M'

Also, replace with C, occurrences in "b_exp" of any non-compile-time constant pseudo-register P that occurs in M, and constant-fold "b_exp" to yield b_exp'

- if M is a compile-time constant, then let M' = M and b_exp' = b_exp for each existing equivalence class Q in UGEC
{
- choose any representative address expression Er(biv, a_exp, b_exp') belonging to Q

- if biv and a_exp of Er and Ei are not identical, move on to the next equivalence class

- symbolically subtract the b_exp' expression for Ei from Er to obtain S

- if S is a non-zero compile-time constant, add Ei to equivalence class Q and move on to consider next address expression on the -continued

```
    work list W
}

- if Ei was not added to any existing equivalence class, then add a
  new equivalence class X to UGEC and add Ei to X. Also associate M'
  with the newly created equivalence class X } until work list W is empty
```

Consider each equivalence class, Q, in turn and do the following:

5. Sort the address expressions within each equivalence class based on their b_exp' terms and replace multiple address expressions with identical b_exp' terms with a single representative address expression.

Since by construction, the address expressions belonging to the same equivalence class differ in their b_exp'terms by a simple constant, it should always be possible to sort them based on increasing b_exp' values.

Let "E_low" be the address expression in Q with the lowest b_exp' value. Compute a relative equivalence class offset, "eq_offset" for each address expression E in Q, as:

E.eq_offset=E.b_exp'-E_low. b_exp'

6. Compute prefetch instructions needed to ensure full cache miss coverage for equivalence class Q.

The goal here is to insert the fewest number of prefetch instructions in the loop body to ensure that in the steady-state, a prefetch is issued for every distinct cache line referenced by the address expressions in the equivalence class Q. Unnecessary prefetches are avoided if possible by exploiting any group-spatial or group-temporal locality that may be apparent among the memory references within each equivalence class.

The method of determining the fewest number of prefetch instructions needed to ensure full cache miss coverage depends on the magnitude of the memory stride, M', associated with the equivalence class.

If M' is <=cache line size, then a prefetch strategy suited to small strides is employed, otherwise a prefetch strategy suited to large strides is used. Note that for large strides, cache line alignment of data elements needs to be considered.

In either case, it is first necessary to identify clusters of references within the uniformly generated equivalence class. A cluster consists of one or more memory references that occur consecutively in the equivalence class list sorted on "eq_offset", with a well-defined cluster leader. The cluster leader is used to generate prefetch data on behalf of all members of the cluster. The objective here is to weed out those refs within an equivalence class that trail other refs within the equivalence class. The refs that are still left standing are essentially cluster leaders.

The manner in which memory references are grouped into clusters depends on the relative size of the memory stride as compared to the cache line size.

a. Cluster identification for small stride equivalence classes.

It is necessary to consider the address expressions in the equivalence-class in the order of increasing "eq_offset" values and determine whether each address expression trails the very next address expression in the equivalence class and if so, drop it from the equivalence class.

Let B(i) and B(i+1) be adjacent memory refs within the sorted equivalence class list. When the memory stride is <=cache line size, B(i) is considered to be in the same cluster as B(i+1), and therefore omitted for prefetch consideration iff I B(i+1).eq_offset−B(i).eq_offset I<=prefetch memory distance where the prefetch memory distance is computed as the product of PFID and the effective memory stride, M' for the equivalence class.

The logic behind this is that if B(i+1) leads a reference B(i) by less than the prefetch memory distance, then there is no real point in inserting a prefetch instruction on behalf of B(i). While some of the initial PFID executions of B(i) within the loop may suffer cache misses, subsequent executions of B(i) would either find its data in the cache or have to wait much less than a full cache miss latency for its data to be retrieved from main memory, since B(i+1) or a prefetch associated with B(i+1) would have initiated the memory retrieval earlier in time. [This is of course assuming that conflict/capacity misses haven't displaced the data from the cache by the time B(i) catches up with B(i+1)].

The last PFID loop iterations can be peeled as described in Mowry et al to avoid the overhead of redundant prefetch instructions that would be executed for data elements not accessed by the original loop.

Figure 11:
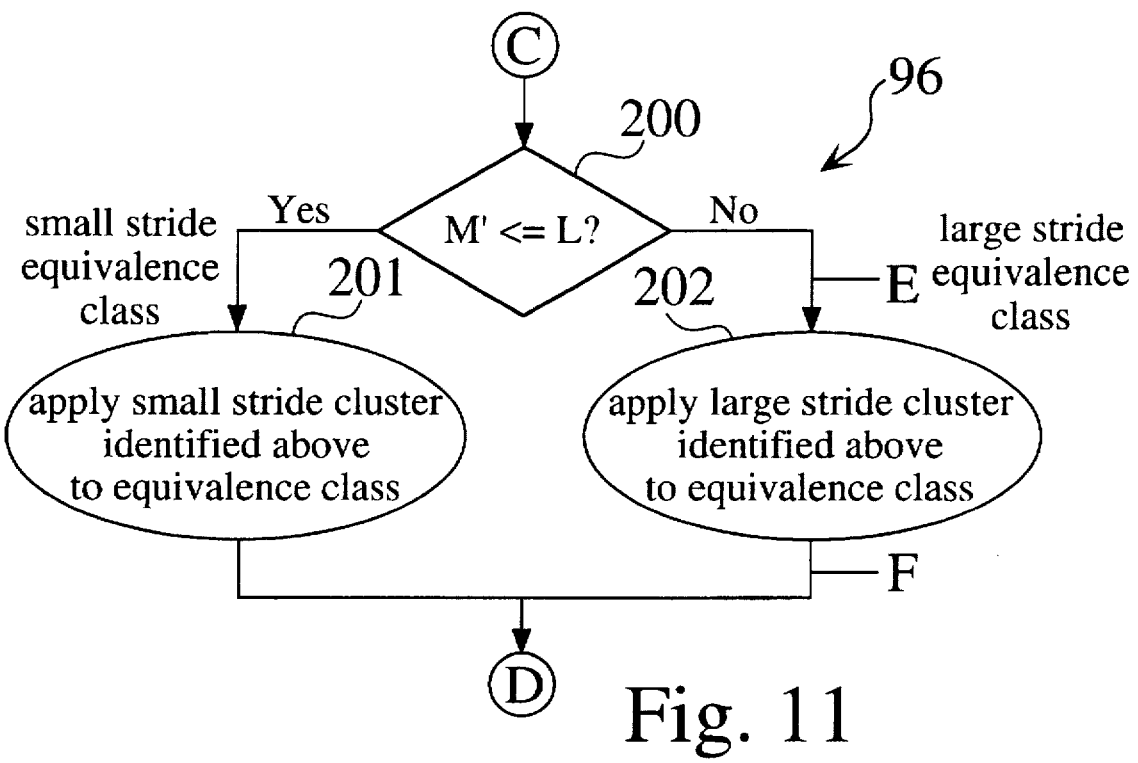
FIG. 11 is a block diagram of a module that is used to compute prefetch instruction needed for equivalence class according to the invention.

As shown on FIG. 9, the module that computes the prefetch instructions necessary to determine equivalence class 96 is identified by the letters C and D, which letters are used to indicate a more detailed explanation of the module, which is shown on FIG. 11. In the figure, the prefetch driver is shown to comprise a module computes the prefetches that are needed 96, where small stride prefetch candidates 201 and large stride prefetch candidates 202 are identified in accordance with a detection module 200. The algorithm for cluster identification with small strides is given below:

for each address expression "p" in the current equivalence class in sorted order, except the very last address expression

```
{
    - let q be the next address expression in the equivalence class

- if (ABS(q.eq_offset − p.eq_offset) <= ABS(M' * PFID))
    {
        remove p from equivalence class list
    }
    else
    {
        - mark p as a leader of a cluster
        - let p.trailing_offset = p.leading_offset = p.eq_offset
    }
}
- mark the very last address expression P in the equivalence class list
as a cluster leader
- let p.trailing_offset = p.leading_offset = p.eq_offset
```

The address expressions remaining in the equivalence class after this weeding out process are all cluster leaders.

b. Cluster identification for large stride equivalence classes.

The algorithm for detecting the fewest number of prefetch candidates needed for an equivalence class with a large stride is unfortunately a bit more complicated than the one used for small- stride equivalence classes. The primary reason for this is that with large memory strides, the relative cache line alignment of the memory refs becomes important. For instance, consider the following "C" loop nest:

```
int A[100][100];
for (i = 0; i < 100; i++)
    for (j = 0; j < 100; j++)
    {
        ...A[j][i]...
```

```
    ... A[j][i+1] ...
}
```

The above source code fragment strides through the array A in large increments for each iteration of the inner j-loop. It must be determined whether it is sufficient to insert only one prefetch instruction on behalf of A[j][i+1], with the assumption that the A[j][i] reference is a trailing reference. The answer is no because the two references could straddle a cache line boundary. If this were the case, then the references to A[j][i] could miss the cache, possibly on every iteration of the j-loop, even though data is prefetched for the A[j][i+1] reference.

However, this is not to say that there is no hope of sharing prefetch instructions among references within a uniformly generated equivalence class with a large stride. For instance, if the first reference in the j-loop above had been to A[j-1][i+1] instead of A[j][i], clearly one prefetch instruction would be sufficient for both references.

Figure 12:
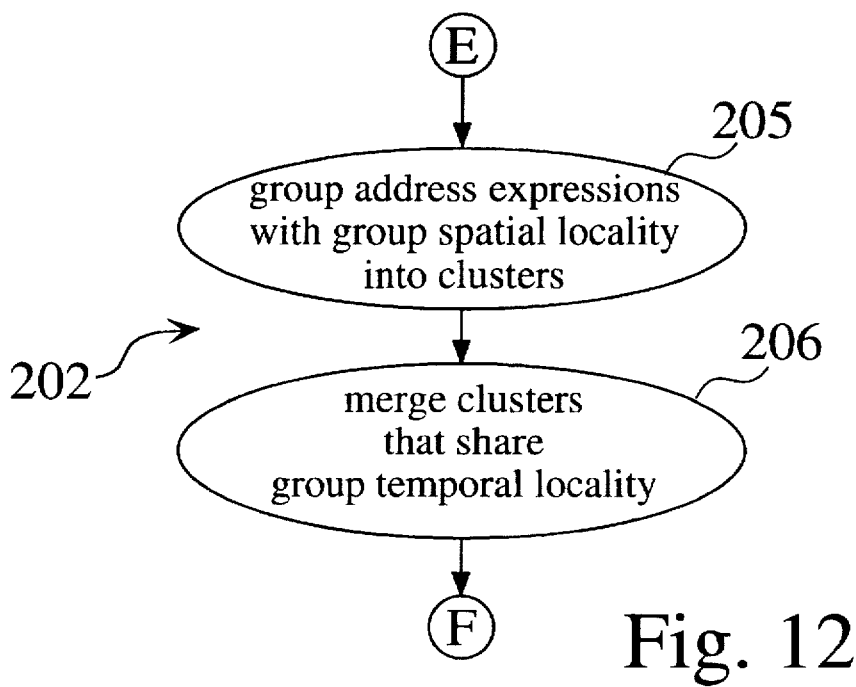
FIG. 12 is a block diagram of a module that applies a large stride cluster identifier to an equivalence class according to the invention.

To make the system immune from the vagaries of relative cache line alignment of references within an equivalence class, yet at the same time exploit obvious temporal locality among the references, a two-pass strategy is used. This strategy is shown in FIG. 12. In the first pass, it is necessary to identify clusters of adjacent references within the current equivalence-class, that are sorted based on their eq_offsets 205. The distinguishing feature of each such cluster is that the references within the cluster share group spatial locality but no group temporal locality.

The leading reference within each such cluster is responsible for prefetching data both for itself and every other reference in the cluster. To accommodate bad breaks with cache line alignments, a cluster leader may give rise to multiple prefetch instructions, each spaced a cache line apart from the next, until the entire span of the cluster is accounted for. To better explain this, consider the following simple loop, which is possibly the result of the loop unrolling step, where "A" is a double-precision array variable, i.e. w/8-byte elements:

```
i_loop:
    A[i] =
    A[i+1] =
    A[i+2] =
    A[i+3] =
    A[i+4] =
    A[i+5] =
    A[i+6] =
    A[i+7] =
    i = i + 8
end_i_loop;
```

First of all, because the loop BIV, "i", has a net loop increment of eight, and the element size of "A" is 8-bytes, this is a large stride equivalence class, assuming a 32-byte cache line size (8×8 bytes=64 bytes)>32 bytes.

All eight references to "A" are placed into the same cluster because they exhibit group spatial locality, and no group temporal locality. The cluster leader is the reference to A[i+7], and the span of the cluster is 64-bytes (i.e. &A[i+7]−&A[i]). If the prefetch memory distance was computed earlier to be 128-bytes, i.e. corresponding to a prefetch iteration distance of two, it is only necessary to insert three prefetch instructions to account for the entire span of this 8-member cluster. These three prefetches essentially prefetch the following array elements:

| prefetch A[i+0+16] ; | p/f for cluster stragglers |
| prefetch A[i+3+16] ; | p/f for cluster stragglers |
| prefetch A[i+7+16] ; | p/f for cluster leader |

Regardless of the cache line alignment of the cluster leader, these three prefetch instructions ensure that all the cluster members have memory transactions initiated for data that they reference two iterations in advance. To simplify the actual generation of these types of prefetch instructions, cluster stragglers are removed from the equivalence class right away, and the cluster span for the representative cluster leader is recorded.

b.i. The high level algorithm for the first pass is shown below:

let q=last address expression in the current equivalence class mark q as a cluster leader let q.trailing_offset=q.leading_offset=q.eq_offset for each address expression "p" in the current equivalence class considered in backward sorted order, ignoring "q"

```
{
  - compute distance from current cluster leader, dist_l as follows:
      dist_l = ABS(q.eq_offset - p.eq_offset)
  - compute distance from current cluster trailer, dist_t as follows:
      dist_t = ABS(q.trailing_offset - p.eq_offset)
  - check the following two conditions to determine if p should be
    included in the cluster headed by q:
      a) dist_t <= cache_line_size
      b) dist_l < M'
  if both these conditions are met, then
      - let q.trailer_offset = p.eq_offset
      - remove p from the equivalence class
  else
      - let q = p and mark q as a cluster leader
      - let q.trailing_offset = q.leading_offset = q.eq_offset
``` b.ii. Having identified cluster leaders in the first pass, in the second pass, the algorithm attempts to exploit temporal locality between clusters (see the module identified by numeric designator 206 on FIG. 12). This pass is somewhat similar to the algorithm used to identify prefetch candidates for small-stride equivalence classes. Basically, if two adjacent clusters are less than the prefetch memory distance apart, as measured between the trailing cluster's leader and the leading cluster's trailer, then the trailing cluster may a be removed from further prefetch consideration.

However, rather than simply forgetting about the trailing cluster, it is necessary to merge the trailing cluster with the leading cluster. The algorithm must increase the span of the leading representative cluster because the merged cluster's span is used later on to determine how many prefetch instructions are actually needed. Note that the size of a merged cluster can not be allowed to exceed the effective memory stride M' because otherwise a prefetch instruction is needlessly inserted for the merged cluster's trailing reference. Instead, a merged cluster's size is clamped to be no larger than the effective memory stride.

Another important consideration in deciding to merge clusters is whether the merge would be profitable. In general, for a cluster C whose span is "C.s" bytes, "C.p" prefetch instructions are inserted. "C.p" can be computed as:

C.p=[ceiling (C.s/L)]+1 where "L" is the cache line size. If a cluster C has "C.b" references within it, then unless (C.p <=C.b),there is no benefit from the locality present within the cluster. This profitability criterion is indirectly applied both in the construction of clusters in the first pass, as well as in the merging of clusters in the second pass. The profitability criterion as applied to the first pass suggests that no two adjacent references within a cluster should be greater than a cache line size apart because, otherwise, it would be better to break the cluster into two sub-clusters. Furthermore, the span of the cluster, as in the distance between the candidate cluster trailer and the current cluster leader, must not become larger than the effective memory stride M', as explained before. A merged cluster's size is therefore clamped to be no greater than the effective stride for this reason.

In the second pass, when deciding whether to merge clusters, the number of prefetches that would be needed for the merged cluster using the above formula is compared to the sum of the prefetches that would be needed if the clusters are not merged.

One subtlety to the cluster merging pass, is that it may sometimes seem unprofitable to merge a cluster C(i) with the next leading cluster C(i+1), even though in a larger context it would have been profitable to merge C(i) with C(i+2), assuming that C(i+2) and C(i) are less than the prefetch memory distance apart. Thus, non-adjacent clusters are examined for merging purposes, and the best cluster to merge with is selected.

If it is decided to merge a cluster C(i) with another cluster C(j), the merged cluster leader's relative offset may become larger than the relative offset of C(j)'s leading reference. Thus, the span of a merged cluster may be larger than simply the difference in the original relative offsets of the cluster leader & cluster trailer. The algorithm used for the second, i.e. cluster merging, pass which is used to exploit temporal locality between clusters is explained below:

The algorithm scans the remaining address expressions in the equivalence class, each of which is a cluster leader identified in the first pass, linearly forwards and looks for merging opportunities with the other leading clusters. In the presentation below, it is assumed for simplicity that the uniformly generated equivalence class has a positive stride.

A necessary condition for a trailing cluster C(i) to be eligible for being merged with a leading cluster C(j) is that:

a) [C(j).trailing_offset–C(i).leading_offset]<pf_memory_distance.

Otherwise, C(j) would be leading cluster C(i) by more than is desired.

Now, let:

m=ceiling [(C(j).trailing._offset–C(i).leading_offset) / M']

where "trailing_offset" and "leading_offset" refer to the eq_offset of the cluster trailer and leader respectively. Note that the trailing cluster may be the result of a previous cluster merger and so it "trailing_offset" may not correspond to a memory reference that actually appears in the source code.

Clearly, it is required that 0<m<PFID.

It is also necessary to define the span of a cluster C(x) to be:

C(x).s=C(x).leading_offset–C(x).trailing_offset

As mentioned earlier, the number of prefetch instructions needed for a distinct cluster C(x) is given by, C(x).p:

C(x).p=[ceiling (C(x).s/L)]+1 where L is the cache line size.

If cluster C(i) is merged with cluster C(j), then the span of the merged cluster C(j') is given by:

C(j').s = MAX {M', C(j').leading_offset – C(j').trailing_offset}
 (the MAX operation clamps the merged cluster size at M')
where C(j').leading_offset =
 MAX {C(j).leading_offset, (C(i).leading_offset + (m * M'))}
and C(j').trailing_offset =
 MIN {C(j).trailing_offset, (C(i).trailing_offset + (m * M'))}

For the merger of cluster C(i) into cluster C(j) to be profitable in terms of reducing the overall number of prefetches required, the following is necessary:

C(j').p<=(C(i).p+C(j).p), which means that:

ceiling (C(j').s/L)<=(ceiling (C(i).s/L)+ceiling (C(j).s/L)).

Let the savings accruing from merging cluster C(i) with C(j) into a combined cluster C(j') be defined as:

merger_savings (i,j,j')=(C(i).p+C(j).p)–(C(j').p.

The criterion "b" for cluster merging may now be articulated. For a cluster C(i), among the leading clusters, C(j) that satisfy criterion "a", the system chooses to merge cluster C(i) with one of those clusters, C(j) for which:

merger_savings (i,j,j') is maximized and non-negative.

Note that while the value of "m" computed as mentioned above represents the minimum positive integral multiple of the stride required to achieve an overlap of C(i) with C(j), it is also necessary to check whether using (m–1) could yield a smaller span, and hence fewer prefetch instructions for the merged cluster. Although projecting the cluster C(i) ahead by (m–1) iterations definitely does not cause it to overlap with C(j), the projected C(i) leader may get very close to the C(j) trailer, causing the system to expend fewer prefetches than if C(i) is projected ahead by one more iteration. This can be especially true if the stride is much larger than the individual cluster spans.

Thus, the algorithm scans the remaining address expressions, which represent clusters identified in the first pass, in sorted order and merge trailing clusters with a selected leading cluster by projecting the trailing cluster ahead by either m or (m–1) iterations and checking if both criteria "a" and "b" apply. To project a trailing cluster C(i) ahead m iterations to evaluate whether it should be merged with a leading cluster C(j), the system computes the tentative "leading_offset" and "trailing_offset" values for the proposed merged cluster C(j'), thusly:

let C(j').leading_offset = C(i).leading_offset + (m * M')
let C(j').trailing_offset = C(i).trailing_offset + (m * M')
if(M' > 0)
{
C(j').leading_offset = MAX (C(j').leading_offset, C(j).leading_offset)
C(j').trailing_offset = MIN (C(j').trailing_offset, C(j).trailing_offset)
} else
{
C(j').leading_offset = MIN (C(j').leading_offset, C(j).leading_offset)
C(j').trailing_offset = MAX (C(j').trailing_offset, C(j).trailing_offset)
} adjust C(j').trailing_offset if needed to ensure C(j').s does not exceed M' as follows:

-continued

C(j').s = ABS (C(j').leading_offset − C(j').trailing_offset)

if (C(j').s > ABS(M'))
{
    C(j').trailing_offset = C(j').leading_offset − M'
    C(j').s = ABS(M')
}

When a cluster C(i) is successfully merged with a cluster C(j) into a cluster C(j'), C(i) is removed from the equivalence class list.

7. Generate the prefetch instructions required for each remaining cluster leader.

It is necessary to consider each cluster leader in turn, and where "trailing_offset" is different than "leading_offset" for any cluster leader, insert as many prefetches as needed to cover the cluster's entire span, i.e. from "leading_offset" down to "trailing_offset", each prefetch instruction address spaced L bytes apart.

More specifically, if the memory reference corresponding to a cluster leader is represented by the instruction:

load disp(Rb),Rt where "disp" is a displacement value and Rb and Rt are pseudo-registers corresponding to the base register and target register of the load, then one or more prefetch instructions are inserted into the code stream as follows:

prefetch_inst new_disp (Rb)

where "new_disp" is computed as disp +(M*PFID) +pf_disp, where "pf_disp" represents the constant offset that needs to the added to the memory address referenced by the cluster leader, to form the base address from which it is necessary to prefetch ahead by the prefetch memory distance. The algorithm used to emit the prefetch instructions is given below:

```
- let L = cache line size for each remaining cluster C(i) in the equivalence
class
{
    - let disp = displacement of memory reference instruction associated
      with the leader address expression for cluster C(i)
    - if(C(i).leading_offset == C(i).trailing_offset) then
    {
         pf_disp = 0
         - emit prefetch_inst with new_disp = disp + (M * PFID)
    }
    else {
         if (M > 0)
         {
              - let cur_offset = C(i).leading_offset
              - let final_offset = C(i).trailing_offset
         }else
         {
              - let cur_offset = C(i).trailing_offset
              - let final_offset = C(i).leading_offset
         }
         - let pf_disp = cur_offset − C(i).eq_offset
         while (cur_offset > final_offset) do
         {
              - emit prefetch_inst with new_disp = disp +
                (M*PFID) + pf_disp
              - let cur_offset = cur_offset − L
              - let pf_disp = pf_disp − L
         }
         - emit one final prefetch to the account for the final member
           of the cluster (i.e. the "leader" for a negative memory stride,
```

-continued

```
         else the "trailer") with new_disp = disp + (M*PFID) +
         (final_offset − C(i).eq_offset)
    }
}
```

Note that in computing new_disp, the original memory stride value M, computed as (a_exp * net biv loop increment), is used and not the constant folded value M'. This may require materializing a run-time region constant expression in a register, outside the loop body, and inserting an explicit add instruction within the loop body to form the prefetch instruction address thusly:

```
Rm = (a_exp * net_biv_loop_increment) * PFID
loop
     Rx = Rm + Rb
     prefetch_inst new_disp'(Rx)
     load disp(Rb),Rt
end_loop
``` where new_disp'=disp +pf_disp. If the prefetch instruction supports an addressing mode which causes the effective memory address to be computed as the sum of two register values, then the add operation may be omitted by folding in the new_disp' value in Rm outside the loop body, yielding Rm', and specifying the Rm and Rb registers operands of the prefetch instruction directly, as shown below:

```
Rm' = ((a_exp * net_biv_loop_increment) * PFID) + new_disp'
loop
     prefetch_inst Rm'(Rb)
     load disp(Rb),Rt
end_loop
```

However, if "disp" itself is a run-time value, as opposed to a simple constant, then an explicit add operation is unavoidable:

```
Rm' = ((a_exp * net_biv_loop_increment) * PFID) + pf_disp
loop
     Rx = Rb + disp
     prefetch_inst Rm'(Rx)
     load disp(Rb),Rt
end_loop
``` and if the prefetch instruction does not support a register+register addressing mode, then two add operations may be needed:

```
Rm = (a_exp * net_biv_loop_increment) * PFID
loop
     Rx1 = Rb + disp
     Rx2 = Rx1 + Rm
     prefetch_inst pf_disp(Rx2)
     load disp(Rb),Rt
end_loop
```

Note however, that these new add instructions may be eliminated through register reassociation. In fact, the prefetch instruction(s) and the beneficiary memory reference instruction may be able to share the same base register through register reassociation, allowing the add instructions to be deleted:

```
Rp - initialized to the address of the memory location referenced by the
     load on the first loop iteration
Rm = (a_exp * net_biv_loop_increment)
Rdelta = (Rm * PFID) + pf_disp
loop
    prefetch_inst Rdelta(Rp)
    load 0(Rp),Rt
    Rp = Rp + Rm
end_loop
```

Furthermore, if the target architecture supports an auto-increment addressing mode (e.g. PA-RISC, IBM Power PC), then the increment of the new base register Rp may be folded into the load instruction itself.

In terms of the code placement of the prefetch instruction itself, to start with, the prefetch instruction(s) may be placed adjacent to the beneficiary memory reference instruction. Subsequently, the instruction scheduling phase may re-order the prefetch instruction(s) as needed to improve performance. In doing this, memory dependencies between the prefetch instruction and other memory references in the loop body may be ignored and assuming the prefetch instruction is guaranteed not to raise an exception, it may be freely scheduled across basic blocks as well.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A compiler, comprising:
   means in a low level optimizer for analyzing and efficiently inserting explicit data prefetch instructions into loops of applications;
   subscript expression analysis means for determining data prefetching requirements;
   means for recognizing cache line reuse patterns across loop iterations to eliminate unnecessary prefetch instructions; and
   means for limiting insertion of explicit prefetch instructions to situations where a lower bound on an achievable loop iteration latency is unlikely to be increased as a result of said prefetch instruction insertion.

2. The compiler of claim 1, wherein analysis and explicit data cache prefetch instruction insertion are performed by said compiler in a machine instruction level optimizer.

3. The compiler of claim 1, further comprising:
   means for exploiting execution profiles from previous runs of an application during insertion of prefetch instructions into innermost loops with internal control flow.

4. The compiler of claim 1, wherein said prefetch insertion means is integrated with other low-level optimization phases.

5. The compiler of claim 4, said other low-level optimization phases comprising:
   any of loop Unrolling, register reassociation, and instruction scheduling.

6. A method for mitigating or eliminating cache misses in a low level optimizer, comprising the steps of:
   performing loop body analysis;
   unrolling loops to reduce prefetch instruction overhead;
   identifying uniformly generated equivalence classes of memory references in a code stream, where said equivalence classes represent disjoint sets of memory references occurring in a loop whose address expressions can be expressed as a linear function of the same basic loop induction variable and are known to differ only by a compile time constant, allowing the detection of group spatial and group temporal locality among said different memory references;
   computing an effective memory stride for each of the equivalence classes;
   determining the number of prefetch instructions needed for full cache miss coverage for each equivalence class, where the number of prefetch instructions that needs to be inserted is a function of the style of prefetching desired, including dumb prefetching that inserts an explicit prefetch instruction for each memory reference, baseline prefetching that inserts as many prefetch instructions as possible without affecting the resource minimum loop iteration latency, and selective prefetching that inserts as many prefetch instructions as are required to ensure full cache miss coverage, exploiting any group-spatial or group-temporal locality that may be apparent among memory references within a uniformly generated equivalence class; and
   inserting prefetch instructions identified into said code stream.

7. The method of claim 6, further comprising the step of:
   estimating a prefetch iteration distance for a loop as the ratio of average miss latency and average loop iteration latency, where the average loop iteration latency is derived from a resource-constrained lower bound on a cycle count based on machine resource usage.

8. The method of claim 6, further comprising the step of:
   substituting a fixed constant value for unknown terms into the address expressions for memory references to run-time dimensioned arrays to facilitate partitioning of such references into disjoint equivalence classes.

9. The method of claim 6, further comprising the step of:
   determining the number of prefetch instructions that are needed for each uniformly generated equivalence class for a selective prefetching strategy.

10. The method of claim 9, further comprising the step of:
    sorting the address expressions for memory references belonging to an equivalence class based on their relative constant differences.

11. The method of claim 9, further comprising the step of:
    determining an effective memory stride for the memory references associated with each equivalence class and classifying the effective memory stride as being either large or small based on whether it is greater than the cache line size.

12. The method of claim 9, further comprising the step of:
    determining prefetch memory distance for the memory references associated with each equivalence class as the product of effective memory stride and prefetch iteration distance for the loop.

13. The method of claim 9, further comprising the step of:
    removing memory references within a small-stride equivalence class that trail other memory references within said equivalence class by less than the prefetch memory distance, wherein memory references that remain are cluster leaders.

14. The method of claim 9, further comprising the step of:
    grouping the memory references belonging to a large-stride equivalence class that are sorted by their constant address expression differences into clusters each of which has a distinct memory reference designated as the cluster leader and zero or more memory references designated as cluster trailers.

15. The method of claim 9, further comprising the step of:

merging clusters represented by their leaders to profitably exploit group temporal locality in a pairwise fashion.

16. The method of claim 6, further comprising the steps of:

deciding which equivalence classes to insert prefetch instructions for an under the baseline prefetching strategy by first sorting uniformly generated equivalence classes based on a prefetch cost/expected benefit criteria, and only committing to insert prefetch instructions for those equivalence classes with the best cost/expected benefit ratio, without causing resource-based minimum loop iteration latency to be exceeded.

17. The method of claim 6, further comprising the steps of:

running through clusters in each equivalence class;

generating explicit prefetch instructions for each cluster; and inserting said prefetch instructions into the code stream.

* * * * *